United States Patent [19]

Otani

[11] Patent Number: 5,381,412
[45] Date of Patent: Jan. 10, 1995

[54] MULTIMEDIA COMMUNICATION APPARATUS

[75] Inventor: Masatoshi Otani, Yokohama, Japan

[73] Assignee: Canon Kabushiki Kaisha, Tokyo, Japan

[21] Appl. No.: 944,075

[22] Filed: Sep. 11, 1992

[30] Foreign Application Priority Data

Oct. 2, 1991 [JP] Japan .................................. 3-283558

[51] Int. Cl.[6] ...................... H04M 11/06; H04N 1/42; H04J 3/22
[52] U.S. Cl. ..................................... 370/84; 370/112; 370/118; 348/14
[58] Field of Search ................. 370/77, 79, 85.7, 95.1, 370/110.1, 112, 118, 84; 379/53, 54, 93, 96; 358/85, 142, 143, 146; 348/14, 552

[56] References Cited

U.S. PATENT DOCUMENTS

| 4,560,833 | 12/1985 | Weber et al. | 358/85 |
| 4,989,235 | 1/1991 | Nomoto | 379/96 |
| 5,042,028 | 8/1991 | Ogawa | 370/110.1 |
| 5,184,345 | 2/1993 | Sahni | 379/93 |

OTHER PUBLICATIONS

NTT Review vol. 3, No. 5, Sep. 1991, pp. 45–49, Tokyo, Japan, M. Yoshikawa; "Latest Developments in Video Conference System."
IEEE Transactions on Communications, vol. 39, No. 11, Nov. 1991, pp. 1698–1708, J. Robinson et al.; "A Multimedia Interactive Conferencing Application for Personal Workstations."
Data Communications International, vol. 20, No. 10, Aug. 1991, pp. 43–47, J. T. Johnson; "Video and LANs: a question of balance."
IEEE Conference on Communications Software: Communications for Distributed Applications & Systems, Tricomm '91, Apr. 18–19, 1991, pp. 23–33, J. Crowcroft et al.; "Multimedia Teleconferencing Over International Packet Switched Networks."
Electronics and Communications Enegineering Journal, vol. 3, No. 1, Feb. 1991, pp. 4–12, P. T. Kirstein et al.; "Experiences With the University of London Interactive Video Education Networks."

Primary Examiner—Douglas W. Olms
Assistant Examiner—Hassan Kizou
Attorney, Agent, or Firm—Fitzpatrick, Cella, Harper & Scinto

[57] ABSTRACT

A multimedia communication apparatus can perform communication while multiplexing multimedia information comprising voice information, video information, data and the like. If the transmission rate of video information in a first channel is greater than a predetermined value, a new additional channel is not connected even if a plurality of channels are connectable. It is thereby possible to automatically set the minimum number of channels necessary for the communication of video information, and to prevent setting of an unnecessary additional channel.

14 Claims, 14 Drawing Sheets

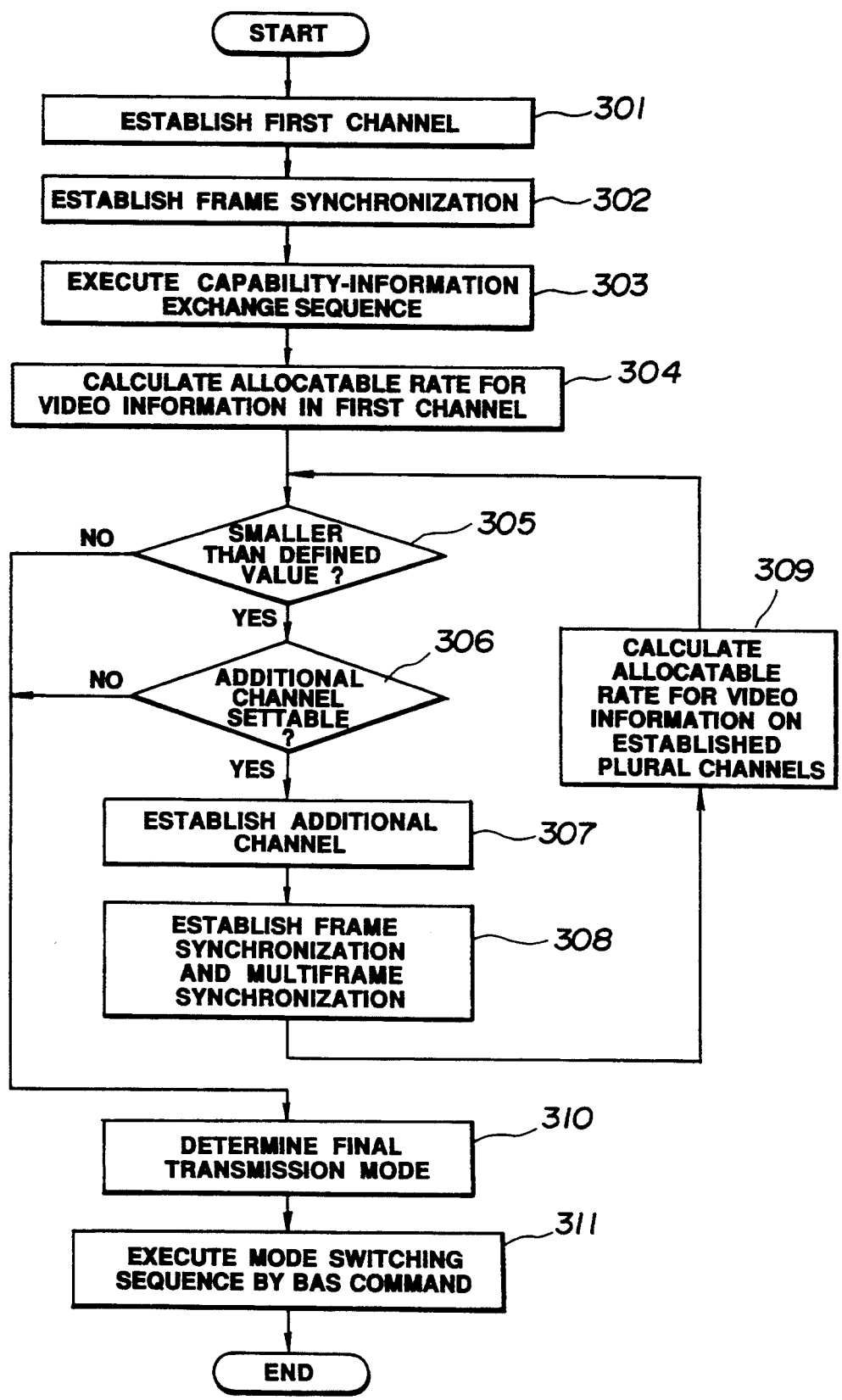

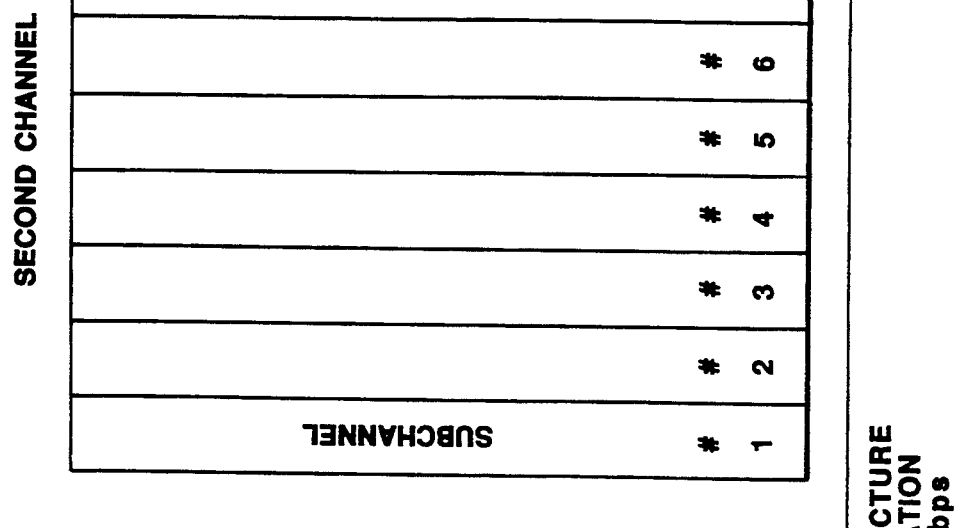
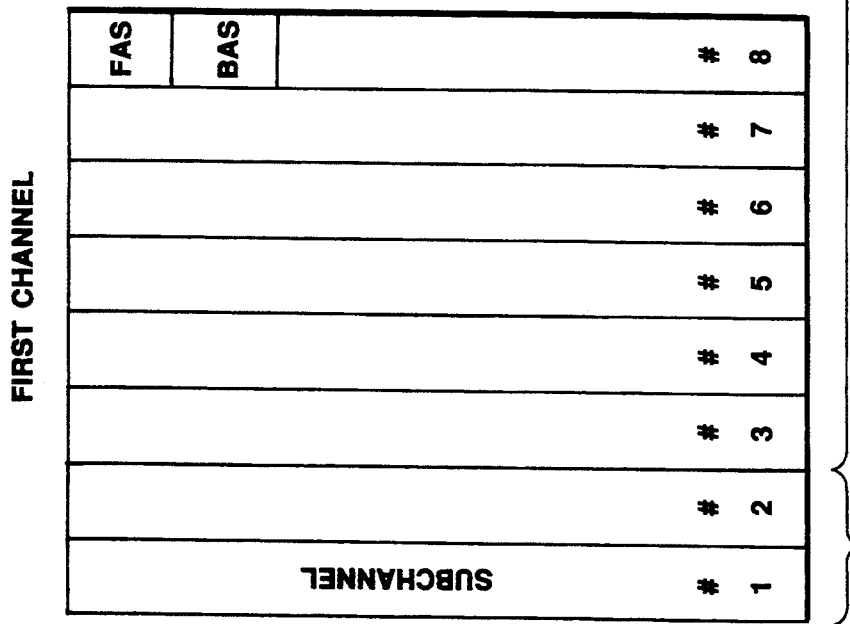

FIG.13

| SUBMULTI-FRAME NUMBER | FRAME NUMBER | FRAME SYNCHRONIZING SIGNAL (FAS) | | | | | | | |
|---|---|---|---|---|---|---|---|---|---|
| | | b1 | b2 | b3 | b4 | b5 | b6 | b7 | b8 |
| SMF1 (MULTIFRAME) | 0 | N1 | 0 | 0 | 1 | 1 | 0 | 1 | 1 |
| | 1 | 0 | 1 | A | E | C1 | C2 | C3 | C4 |
| SMF2 | 2 | N2 | 0 | 0 | 1 | 1 | 0 | 1 | 1 |
| | 3 | 0 | 1 | A | E | C1 | C2 | C3 | C4 |
| SMF3 | 4 | N3 | 0 | 0 | 1 | 1 | 0 | 1 | 1 |
| | 5 | 1 | 1 | A | E | C1 | C2 | C3 | C4 |
| SMF4 | 6 | N4 | 0 | 0 | 1 | 1 | 0 | 1 | 1 |
| | 7 | 0 | 1 | A | E | C1 | C2 | C3 | C4 |
| SMF5 | 8 | N5 | 0 | 0 | 1 | 1 | 0 | 1 | 1 |
| | 9 | 1 | 1 | A | E | C1 | C2 | C3 | C4 |
| SMF6 | 10 | L1 | 0 | 0 | 1 | 1 | 0 | 1 | 1 |
| | 11 | 1 | 1 | A | E | C1 | C2 | C3 | C4 |
| SMF7 | 12 | L2 | 0 | 0 | 1 | 1 | 0 | 1 | 1 |
| | 13 | L3 | 1 | A | E | C1 | C2 | C3 | C4 |
| SMF8 | 14 | TEA | 0 | 0 | 1 | 1 | 0 | 1 | 1 |
| | 15 | R | 1 | A | E | C1 | C2 | C3 | C4 |

| | BIT-RATE ALLOCATION SIGNAL (BAS) | | | | | | | |
|---|---|---|---|---|---|---|---|---|
| | b9 | b10 | b11 | b12 | b13 | b14 | b15 | b16 |
| EVEN FRAME | B0 | B1 | B2 | B3 | B4 | B5 | B6 | B7 |
| ODD FRAME | P2 | P1 | P0 | P4 | P3 | P5 | P6 | P7 |

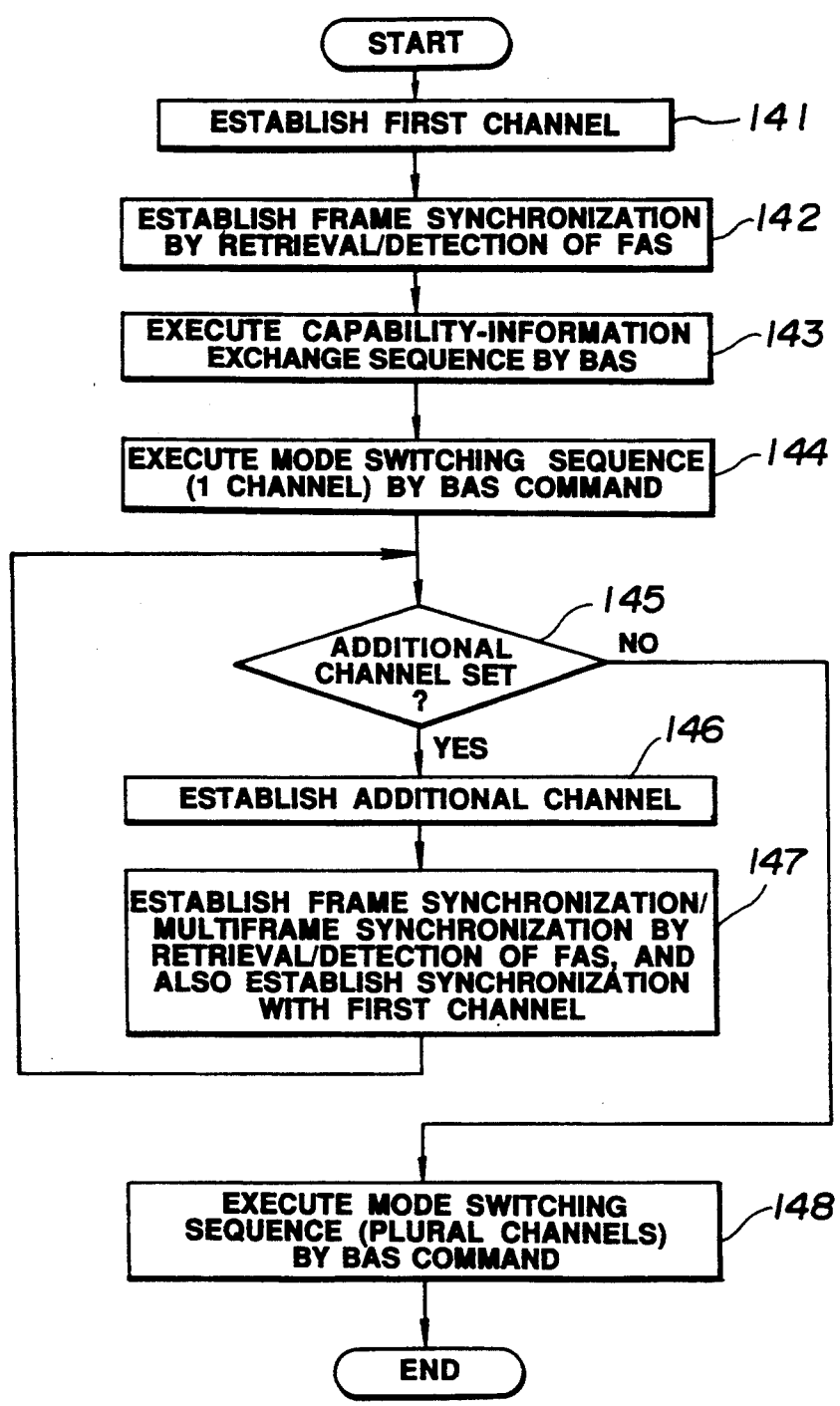

MULTIMEDIA COMMUNICATION APPARATUS

BACKGROUND OF THE INVENTION

1. Field of the Invention

This invention relates to a multimedia communication apparatus represented by an AV (audiovisual) communication apparatus, such as a video telephone apparatus, a television meeting system or the like, in which mutual communication can be performed by multiplexing multimedia information comprising voice information, video information, data and the like.

2. Description of the Related Art

Recently, communication services via an ISDN (integrated services digital network) have started to be practically used, and AV services, such as video telephones, television meeting systems and the like, using such a digital network have attracted notice. Service provisions for AV services, protocol provisions, multimedia multiplex frame structure provisions, encoding methods of moving-picture information and the like have been announced as CCITT (Comité Consulatif International Télégraphique et Téléphonique)'s recommendations H. 320, H. 242, H. 221, H. 230, H. 261, and the like. In H. 221, frame structures in AV services on channels having bit rates of 64 kbps (kilobits per second)-1920 kbps are provided.

FIG. 12 shows the frame structure in H. 221 on a single channel having a bit rate of 64 kbps. In FIG. 12, numerals 1 -8 indicated in the abscissa represent bit numbers, and numerals 1-80 indicated in the ordinate represent octet numbers. One frame comprises 80 octets. In FIG. 12, frame synchronization, multiframe synchronization, the function of monitoring communication quality, notification of alarm information, and the like are controlled by FAS's (frame synchronizing signals).

FIG. 13 is a diagram showing the bit assignment of FAS's in 1 multiframe=8 submultiframes (1 submultiframe=2 frames). BAS's (bit-rate allocation signals) assign the capability of terminals and actual allocation of bit rates to respective media within frames, and perform various kinds of controls and notification. As shown in FIG.2, BAS's are transmitted in even frames, and corresponding error-correcting bits are transmitted in odd frames.

In H. 242, communication procedures, such as a capability-information exchange sequence, a mode switching sequence and the like using BAS's on in-channel between AV terminals are provided. In H. 320, system aspects for the entirety of AV services are provided. In H. 230, transmission-frame synchronization or various kinds of controls and notification requiring an urgent response are provided as additional information to functions necessary for AV services. In H. 261, methods of encoding/decoding moving-picture information in bit rates of p×64 kbps (p=1-30) are provided.

FIG. 14 shows a basic sequence in performing multimedia communication of images, voice, data (all kinds of user's information other than images and voice) according to the above-described recommendations.

First, by starting a multimedia communication apparatus which is intended to start communication (hereinafter termed a calling-side apparatus), a first channel is established in step 141. In the case of the ISDN, this corresponds to a call-setting sequence in the D-channel. Subsequently, in step 142, frame synchronization is established by retrieval/detection of an FAS and transmission/detection of A-bit=0 on the channel set in step 141 (corresponding to the B-channel, the H-channel or the like in the ISDN).

After establishing synchronization, in step 143, the capability of the communication partner's apparatus is determined by a capability-information exchange sequence by transmission, reception and detection of a capability BAS. Subsequently, in step 144, multiplex allocation of multi-media information on the first channel is determined, a mode switching sequence by transmission/reception of a BAS command is performed, and multimedia-information multiplex communication is started.

In practice, there is a case in which only voice information can be communicated, or a case in which only voice information is communicated until an additional channel is established.

The process then proceeds to step 145, and further to step 146 if the communication partner's apparatus has a capability of providing an additional channel, and the additional channel is established. Subsequently, in step 147, processing for establishing frame synchronization and multiframe synchronization, and synchronization with the first channel, is performed utilizing retrieval/detection of an FAS in the additional channel, and an A-bit. The process then returns to step 145, where it is determined whether or not an additional connection is further required.

If an additional channel is not required, in step 148, an operational mode suitable for the utilization of all the channels is determined, a mode switching sequence by transmission/reception of a BAS command is performed, and multimedia multiplex communication is performed.

There is a case in which the mode switching sequence by a BAS command to be performed in step 148 is performed immediately after step 144, ant a mode switching sequence is performed every time a channel is added whenever necessary. In the above-described recommendations, however, there is no particular provision about whether the start of an operation for establishing an additional channel must be performed by the calling-side apparatus or by the reception-side apparatus, and what a specific trigger for that operation is. Furthermore, there is no particular provision either about whether an additional channel must be unconditionally established if each of the two apparatuses has the capability of providing an additional channel, or whether an operation for establishing an additional channel must be started by some particular trigger.

In the above-described conventional approach, however, in an apparatus which unconditionally sets an additional channel after it has been determined that the communication partner's apparatus also has the capability of providing an additional channel by a capability-information exchange sequence, while the user need not intentionally perform an operation to set an additional channel, an additional channel is automatically set even if it is unnecessary, and therefore an unnecessary network tariff is charged without the user acknowledging it.

In an apparatus in which an additional channel is always started by an operation of the user, the user will know he must always be alert to the need for this operation, and the operation itself can be troublesome.

In addition, in the conventional approach, sufficient care has not yet been taken &bout when and in which conditions video information must be transmitted. Accordingly, transmission is unconditionally started even if a transmission rate allocatable to video information is insufficient, or an additional channel allowed by a capability-information exchange sequence is unconditionally set. As a result, the additional channel is in a vacant state because transmission of video information is not immediately started, whereby an unnecessary network tariff is charged. Furthermore, in the transmission of video information, a trigger to start transmission at the calling side and the reception side is not considered. Hence, it may happen that transmission of video information is immediately started also at the reception side, or although it is possible to change the setting of whether or not video information must be transmitted, the setting cannot be easily changed.

SUMMARY OF THE INVENTION

It is an object of the present invention to remove the above-described problems in the prior art.

It is a further object of the present invention to provide a multimedia communication apparatus which can prevent an unnecessary use of a network.

It is a still further object of the present invention to provide a multimedia communication apparatus which can automatically set a channel without wastefully using a network by automatically setting the minimum number of channels necessary for communicating video information, and not setting an unnecessary additional channel, It is still another object of the present invention to provide a multimedia communication apparatus which can prevent a unnecessary use of a network due to setting an unnecessary channel when video information is not transmitted by determining whether or not an automatic setting of an additional channel must be started after comparing a transmission rate allocatable for video information in a channel at a time period when the start of video transmission is instructed by an operation of the user with a certain defined value, and executing the setting if the result of the determination is affirmative.

It is a still further object of the present invention to provide a multimedia communication apparatus which can determine whether or not a channel in a "vacant" state has been generated when an operation of the user has instructed the stop of transmission of video information, and which can automatically release a vacant channel when the channel has entered a "vacant" state.

It is still another object of the present invention to provide a multimedia communication apparatus which can mitigate a negative reaction of the user against an instant response to the reception of video telephone at the reception side by automatically turning on a trigger to start transmission of video information according to the start of a calling operation at the calling side, and not automatically starting transmission of video information before an operation of the user at the reception side.

These and other objects, advantages and features of the present invention will become more apparent from the following detailed description of the preferred embodiments taken in conjuction with the accompanying drawings.

BRIEF DESCRIPTION OF THE DRAWINGS

FIG. 3 is a flowchart showing a control-operation procedure of the apparatus in the first embodiment;

FIGS. 4(a) through 7 are diagrams showing the structure of multiplex frames indicated in the CCITT's recommendation draft H. 221;

FIG. 13 is a diagram showing bit allocation for FAS's and BAS's within a multiframe; and FIG. 14 is a flowchart showing a control-operation procedure of a conventional multimedia communication apparatus.

DETAILED DESCRIPTION OF THE PREFERRED EMBODIMENTS

An explanation will now be provided of preferred embodiments of the present invention with reference to the drawings.

First Embodiment

Figure 1:
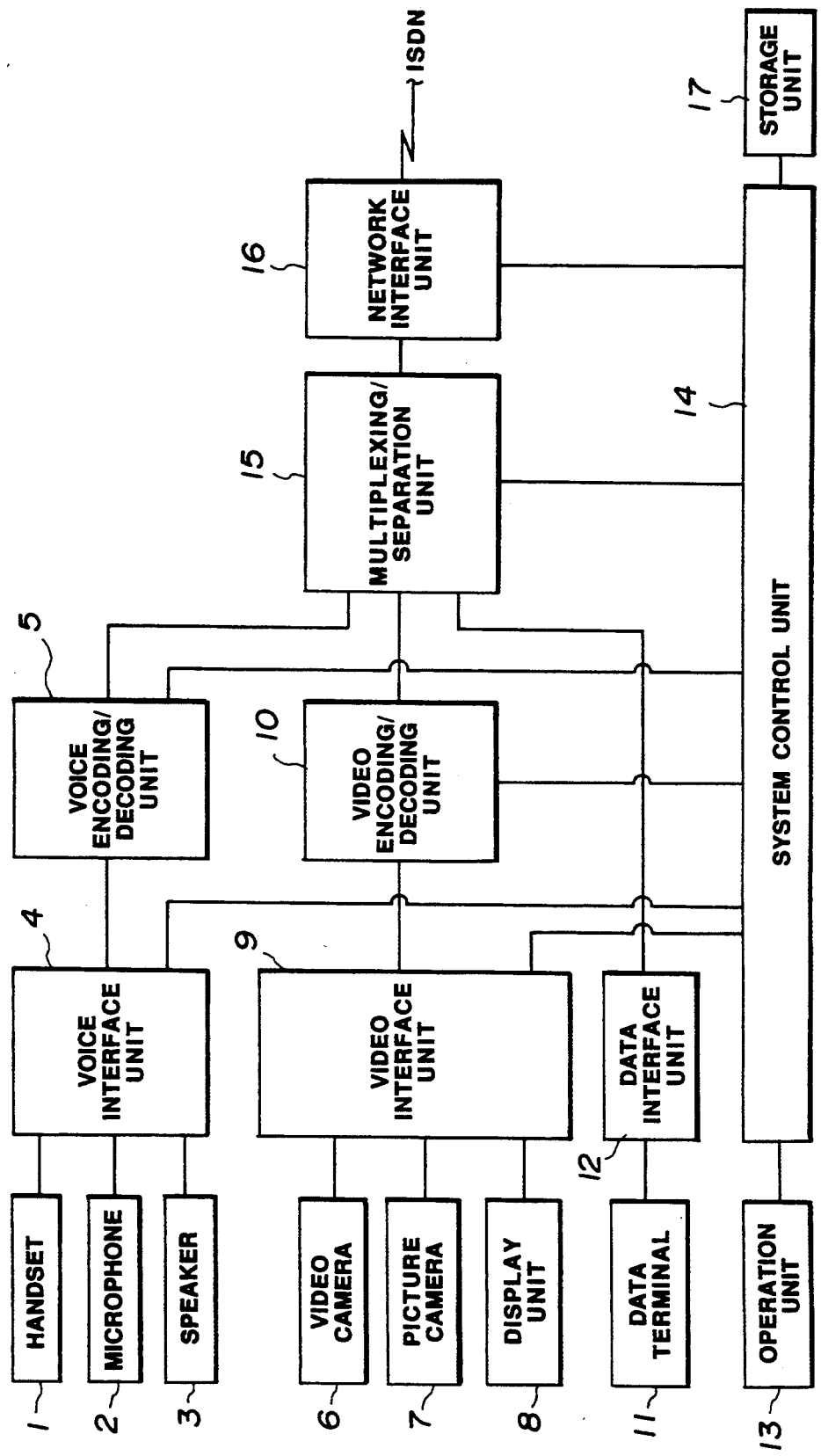
FIG. 1 is a block diagram showing the configuration of a multimedia communication apparatus according to a first embodiment of the present invention.

FIG. 1 is a block diagram showing the configuration of a multimedia communication apparatus according to a first embodiment of the present invention. In FIG. 1, a handset (a transmitter-receiver) 1 serves as a voice input/output means of the present apparatus. A microphone 2 serves as a voice input means of the apparatus. A speaker 3 serves as a voice output means of the apparatus. The handset 1, the microphone 2 and the speaker 3 are connected to a voice interface unit 4.

The voice interface unit 4 performs, according to an instruction from a system control unit 14 (to be described later), for example, stitching processing for switching the operations of the handset 1, the microphone 2 and the speaker 3, on-hook/off-hook detection processing for detecting whether the handset 1 is in an on-hook state or in an off-hook state, echo cancel processing for removing an echo when the microphone 2 and the speaker 3 are operated, and tone generation processing for generating a dial tone, a ringing tone, a busy tone, a call-reception tone or the like. The voice interface unit 4 is connected to a voice encoding/decoding unit 5.

According to an instruction from the system control unit 14, the voice encoding/decoding unit 5 encodes a voice signal to be transmitted, or decodes a received voice signal in accordance with a voice-signal encoding/decoding rithm, such as 64 kbps PCM (pulse-code modulation) A-law, 64 kbps PCM $\mu$-law, 64 kbps/56 kbps/48 kbps SB-ADPCM (adaptive differential pulse-code modulation), 32 kbps ADPCM, 16 kbps (for example, APC-AB), 8 kbps or the like.

A video camera 6 serves as an image input means of the apparatus, and inputs an image of the user or the like. A picture camera 7 also serves as an image input means of the apparatus, and inputs a picture, a drawing or the like. An image display unit 8 displays an input image from the video camera 6 or the picture camera 7, a received image from the communication partner, an operational picture frame or the like. The video camera 6, the picture camera 7 and the image display unit 8 are connected to a video interface unit 9.

According to an instruction from the system control unit 14, the video interface unit 9 performs switching processing between the image input means, display switching processing of the inn image, the received image and the operational picture frame on the image display unit 8, video-signal synthesis processing for displaying the above-described images on the image display unit 8 while dividing them, or the like. The video interface unit 9 is connected to a video encoding/decoding unit (an image coded unit) 10.

The video encoding/decoding unit 10 encodes a video signal to be transmitted, and decodes a received video signal according to the CCITT's recommendation draft "H. 261".

A data terminal 11 performs transmission/reception of data, and is connected to a data interface unit 12. The data interface unit 12 transmits data to be transmitted received from the data terminal 11 and the system control unit 14 to a multiplexing/separation unit 15 (to be described later), and also transmits received data to the data terminal 11 or the system control unit 14.

An operation unit 13 comprises a keyboard used for inputting control information for controlling the entire apparatus, a touch panel and the like. The voice interface unit 4, the voice encoding/decoding unit 5, the video interface unit 9, the video encoding/decoding unit 10, the data interface unit 12 and the operation unit 13 are connected to the system control unit 14.

The system control unit 14 includes a CPU (central processing unit), a ROM (read-only memory), a RAM (random access memory), an auxiliary storage unit and the like. The system control unit 14, for example, monitors the states of the respective units to control the entire apparatus, calculates transmission speeds allocated to respective media according to input control information, the state of the utilized network, and the like, forms the operational/display picture frame in accordance with the determination, the control and the state of the final mode, and executes application programs.

The voice encoding/decoding unit 5, the video encoding/decoding unit L0 and the data interface 12 are connected to the multiplexing/separation unit 15. The multiplexing/separation unit 15 multiplexes voice signals from the voice encoding/decoding unit 5, video signals from the video encoding/decoding unit 10, data from the data interface unit 12, data from the system control unit 14, and control information according to the CCITT's recommendation drafts "H. 221", "H. 242" and the like, in units of a transmission frame in accordance with the CCITT's recommendation draft "H. 221", divides the reception frame into respective constituent media, and transmits the resultant data to the respective units. The multiplexing/separation unit 15 is connected to the system control unit 14 and a network interface unit 16.

The network interface unit 16 controls the network in accordance with an ISDN user network interface. A storage unit 17 stores various kinds of control information, and is connected to the system control unit 14.

Figure 2:
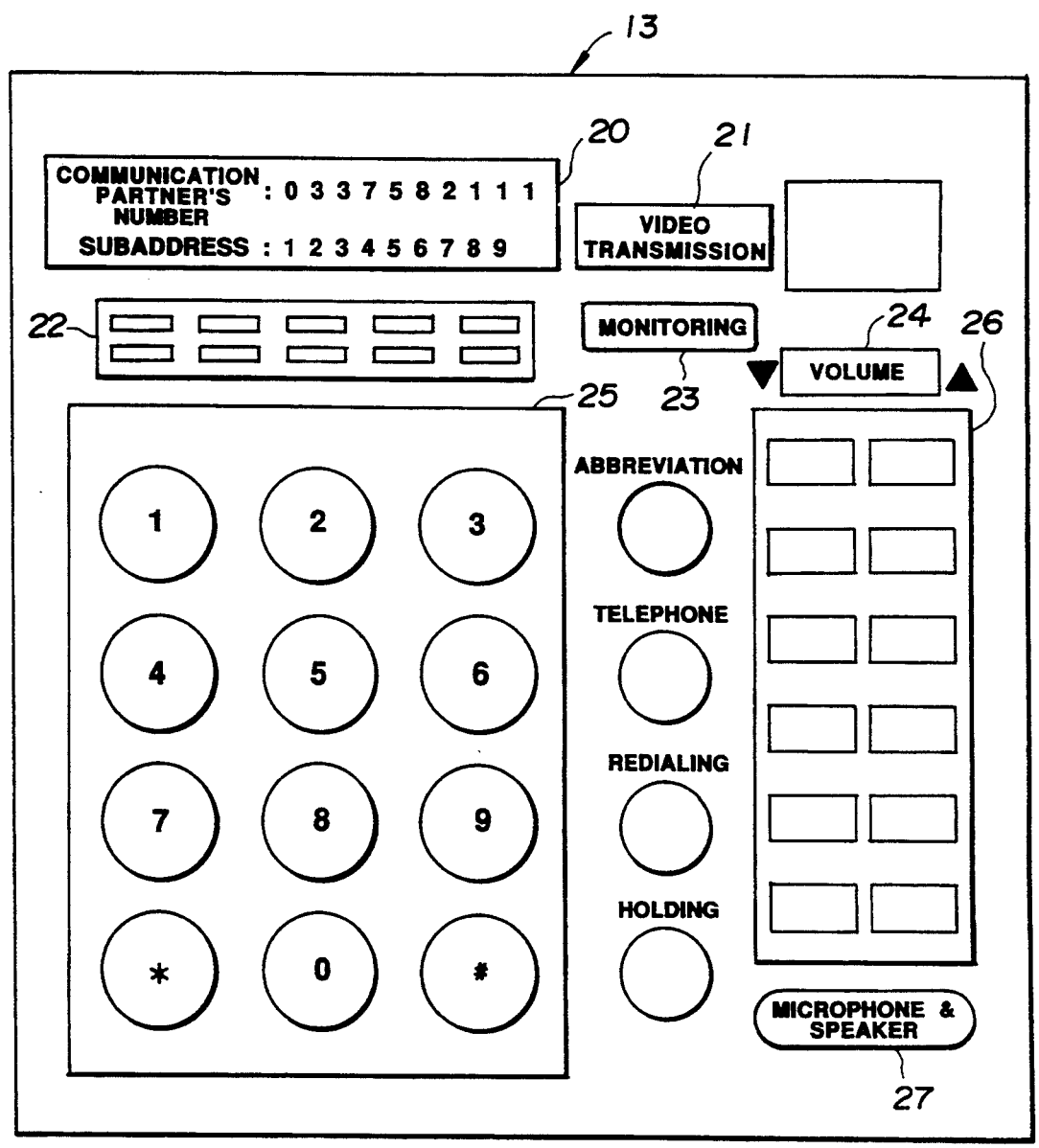
FIG. 2 is a plan view showing a specific example of the operation unit of the apparatus shown in FIG. 1.

FIG. 2 is a diagram showing a specific example of the operation unit 13. In FIG. 2, a display unit (display means) 20, comprising an LED (light-emitting diode) or the like, displays various kinds of information, such as input information for operations, various kinds of received information, and the like. A video transmission key 21 instructs the start/stop of transmission of video information. Various kinds of function keys 22 instruct registration, change, execution and control of additional services of the apparatus. There are also shown a monitoring-display switching key 23, a voice-output-volume adjustment key 24, ten keys 25 for dial inputs, a one-touch dial key, and a switching key 27 for switching between the microphone and speaker and the handset.

Next, the operation of the multimedia communication apparatus of the present invention having the above-described configuration will be explained in detail with reference to the flowchart shown in FIG. 3.

First, in step 301, a first channel is established. More specifically, in the case of the ISDN, the first channel is established on the D-channel by the reception of a CONN (notifying that the called person has responded (offhook)) message for the transmission of a SETUP (request of call setting) by a D-channel call control, and by the reply of a CONN-ACK (confirmation of the CONN).

Next, in step 302, in order to establish a channel on in-channel, synchronization by the H. 221 frame is first established. If the frame synchronization has been mutually established, the process proceeds to step 303, where a capability-information exchange sequence by the transmission/reception of a capability BAS is executed. If the capability-information exchange sequence has been completed, the process proceeds to step 304, where a settable communication mode is determined according to the result of a comparison between the capability of the user's own apparatus and the capability of the communication partner's apparatus.

For example, as a first case, if it is assumed that the transfer-rate capability=2B, the voice capability=16 kbps/A-law/μ-law, and the video capability=H. 261 CIF & QCIF as common capabilities, the transfer rate=2B, video =ON, and voice=16 kbps/A-law/μ-law are selectable as a common communication mode.

Which voice mode must be selected differs according to whether priority must be given to voice quality or picture quality. If priority must be given to picture quality, it becomes possible to perform multiplexing of multimedia information, as shown in FIGS. 4(a) and 4(b).

Figure 5:
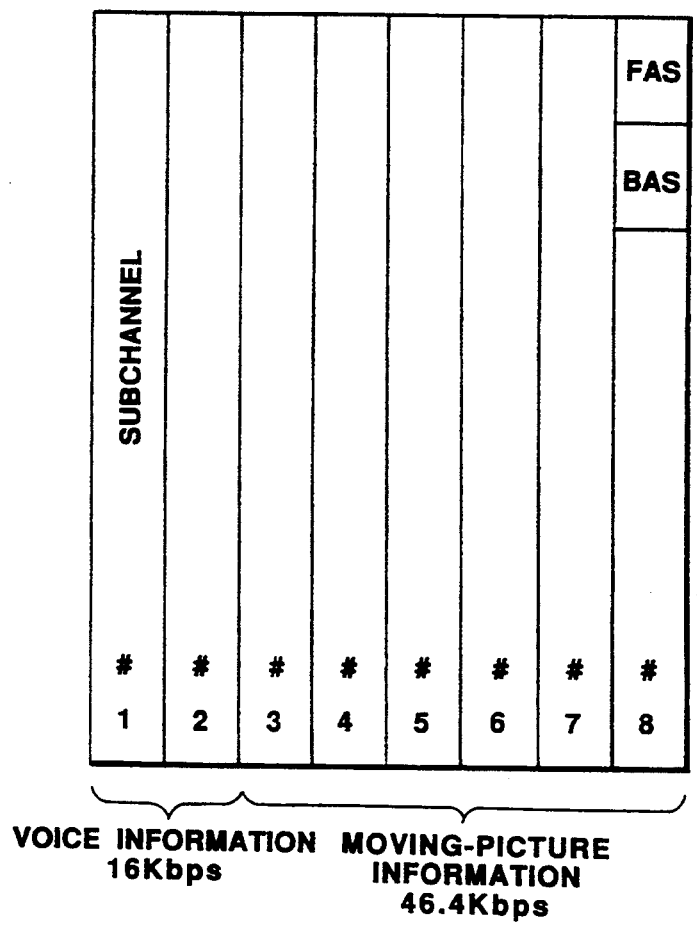

In step 304, the allocatable rate for video information in multimedia information multiplexing on the first channel is calculated. In this case, 46.4 kbps when voice information of 16 kbps is selected becomes the maximum allocatable rate when the video information is multiplexed with voice information, as shown in FIG. 5.

For example, as a second case, if it is assumed that the tranfer-rate capability=2B, the voice capability=A-law/μ-law, and the video capability=H. 261 CIF/QCIF as common capabilities, the transfer rate=2B, video=ON, and voice=A-law/μ-law are selectable as a common communication mode.

Figure 7:
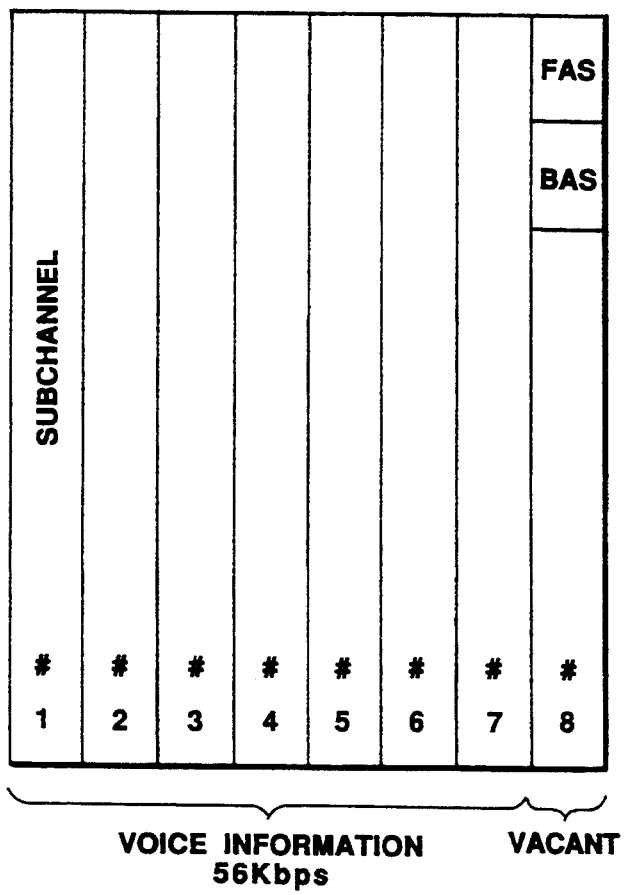

If multiplexing of multimedia information is performed at that time, a communication mode as shown in FIGS. 6(a) and 6(b) is obtained. When only the first channel is used, only the mode shown in FIG. 7 is selectable. The allocatable rate for video information at that time is 6.4 kbps.

In step 305, the allocatable rate for video information calculated in step 304 is compared with a defined value X. If the defined value X is assumed to be 30 kbps, the allocatable rate for video information in the first case is greater than the defined value X, and the allocatable rate for video information in the second case is smaller than the defined value X. If the allocatable rate for video information is smaller than the defined value X, the process proceeds to step 308, where it is determined whether or not an additional channel is settable.

If the transfer-rate capability still permits an additional channel, the process proceeds to step 307, where an additional channel is established. In step 307, as in step 301, call-setting in out-channel is performed. In the case of the ISDN, the same setting as in step 301 by D-channel call-control is performed. Subsequently, in step 308, synchronization by the H. 221 frame on in-channel is established as well as multiframe synchronization. The process then proceeds to step 309, where the allocatable rate for video information on a plurality of established channels is calculated, and the process returns to step 305.

For example, in the above-described second case, the video-information rate becomes 68.8 (62.4+6.4) kbps, as shown in FIGS. 6(a) and 6(b).

If it has been determined in step 305 that the allocatable rate for video information is greater than the defined value X, the process proceeds to step 310, where the final transmission mode is determined. In the next step 311, a BAS command is transmitted, and transmission according to the corresponding transmission mode is actually started by switching the transmission mode. The control operation is thus terminated.

If it has been determined in step 306 that an additional channel cannot be set, the process proceeds to step 310. At that time, whether a mode of transmitting video information is selected even if the allocatable rate for video information is less than the defined value X, or a mode of not transmitting video information is selected as the final transmission mode depends on the determination of each apparatus or the determination of the user.

As explained above, according to the multimedia communication apparatus of the first embodiment of the present invention, even if an additional channel is determined to be settable by determining the capability of the communication partner's apparatus according to a capability-information exchange sequence, the operation of setting an additional channel is not unconditionally started. The transmission rate allocatable for video information when multiplexing of voice and video information using only the first channel is performed is calculated, and it is determined whether or not the calculated value is greater than the defined value. If the calculated value is smaller than the defined value and an additional channel is settable, an operation of setting the additional channel is started. If the calculated value is greater than the defined value, it is determined that the channel is sufficient for the intended transmission of video information, and an operation of setting an additional channel is not activated. Thus, only a channel which will secure at least the defined value is automatically set, and an unnecessary additional channel is not set. It is thereby possible to prevent unnecessary use of the network caused by unconditional setting of an additional channel.

Second Embodiment

Figure 8:
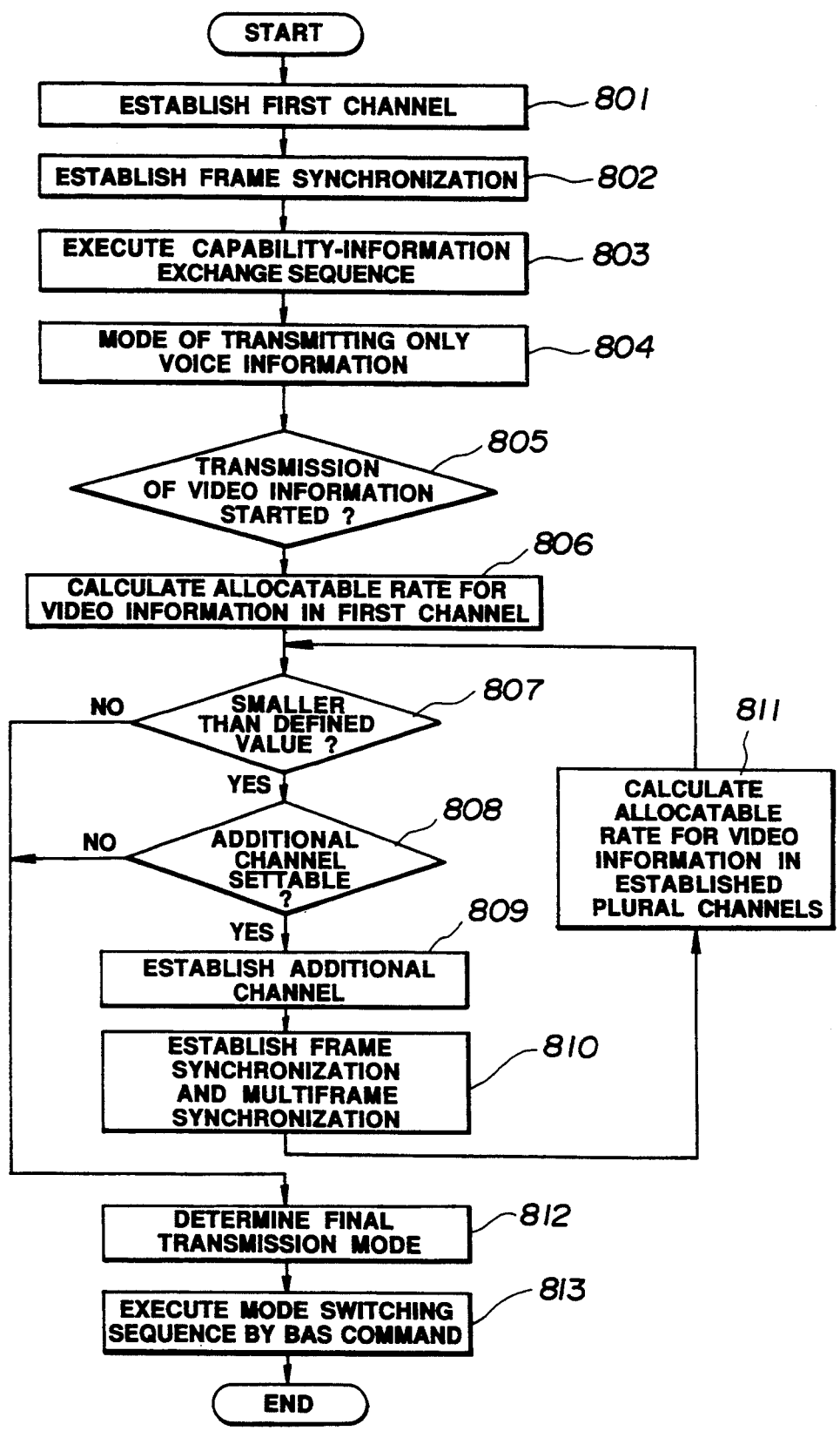
FIG. 8 is a flowchart showing a control-operation procedure in a second embodiment of the present invention.

Next, an explanation will be provided of the operation of a multimedia communication apparatus according to a second embodiment of the present invention with reference to the flowchart shown in FIG. 8. Processing from step 801 to step 803 is the same as the processing from step 301 to step 303 shown in FIG. 3. Subsequently, in step 804, a mode of transmitting only voice information is set. In step 805, the process waits until the start of transmission of video information is instructed by an operation of the user.

When the start of transmission of video information has been instructed, the process proceeds to step 806, where the allocatable rate for video information when multiplexing of voice and video information is performed on the first channel is calculated. Subsequently, in step 807, the allocatable rate for video information calculated in step 806 is compared with the defined value X. If the calculated value is less than the defined value, the process proceeds to step 808. Processing in steps 808-811 is the same as the processing in steps 306-309 shown in FIG. 3.

If the calculated value is greater than the defined value in step 807, and if it has been determined that an additional channel cannot be set in step 808, the process proceeds to step 812 and step 813. Processing in steps 812 and 813 is the same as the processing in steps 310 and 311 shown in FIG. 3.

As described above, according to the multimedia communication apparatus of the second embodiment of the present invention, when setting of a mode of not unconditionally starting transmission of video information is selected, an operation of setting an additional channel is not automatically started even if the additional channel is settable. When the start of transmission of video information has been instructed by an operation of the user, the allocatable transmission rate for video information in the channel at that time period is compared with a certain defined value, and it is determined whether or not automatic setting of an additional channel must be started, and the setting is executed if the result of the determination is affirmative. It is thereby possible to prevent unnecessary use of the network caused by setting an unnecessary channel when video information is not transmitted.

Third Embodiment

Figure 9:
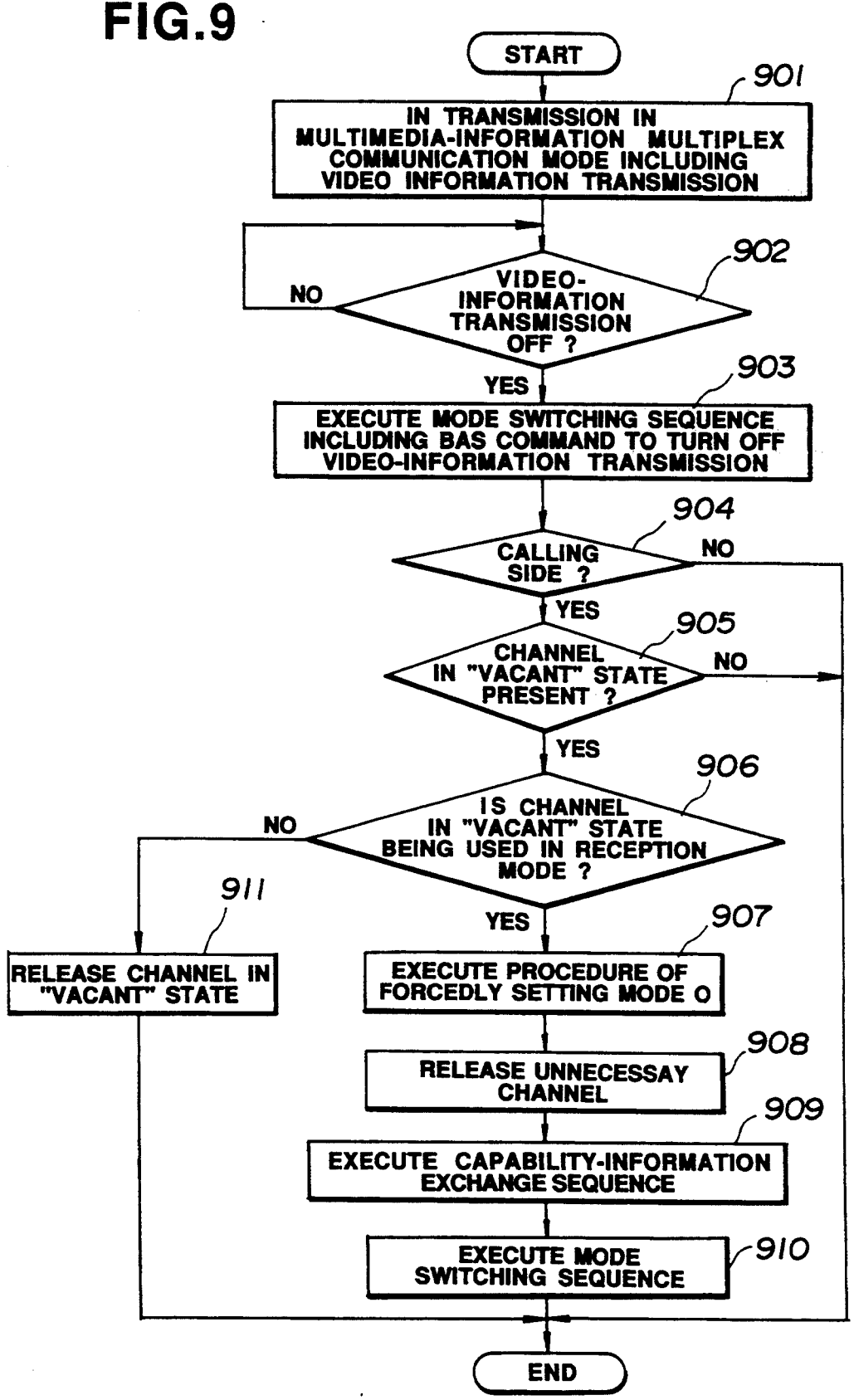
FIG. 9 is a flowchart showing a control-operation procedure in a third embodiment of the present invention.

Next, an explanation will be provided of a multimedia communication apparatus according to a third embodiment of the present invention with reference to the flowchart shown in FIG. 9.

First, if a transmission operation is performed in a multimedia-information multiplex communication mode including image information in step 901, whether or not an instruction to stop (turn off) the transmission of image information has been instructed is monitored in step 902. When an instruction to stop the transmission of video information has been performed by an operation of the user, the process proceeds to step 903, where a mode switching sequence including a BAS command to turn off the transmission of video information is executed.

Subsequently, in step 904, it is determined whether the user's own apparatus is at the calling side or at the reception side. If the user's own apparatus is at the calling side, the process proceeds to step 905, where it is determined whether or not a channel in a "vacant" state has been generated in a transmission mode from the user's own apparatus according to the mode switching sequence in the above-described step 903.

For example, in the states shown in FIGS. 4(a) and 4(b) or FIGS. 6(a) and 6(b), if the transmission of video information is turned off, the second channel enters a "vacant" state. On the other hand, in the state shown in FIG. 5, the first channel does not enter a "vacant" state even if the transmission of video information is turned off.

If a channel in a "vacant" state has been generated, the process proceeds to step 906. In step 906, by checking the reception mode, it is determined whether or not the channel in a "vacant" state is used in the reception mode, that is, used in the transmission mode of the communication partner's apparatus while the transmission operation is performed in the multimedia-information multiplex transmission mode including the transmission of video information. If the result of the determination is affirmative, the process proceeds to step 907. In step 907, a procedure of forcedly setting the mode 0 defined in H. 242 is executed, and both transmission and reception are switched to a mode of communicating only voice information using only the first channel.

The process then proceeds to step 908, where the unnecessary channel which enters a "vacant" state when the transmission of video information is turned off determined in the above-described step 905 is released. More specifically, in the ISDN, according to the D-channel call-control, the channel is decreased in the sequence of the procedure of DISC (request for call-release) message, REL (notification of the completion of disconnection of the channel, and request of release of the called number) message, REL-COMP (release of the channel, and notification of the completion of release of the called number) message and the like. The process then proceeds to step 909, where the capability-information exchange sequence is executed again, and the process proceeds to step 910. In step 910, a mode switching sequence, in which the calling side selects the transmission mode corresponding to the mode switching sequence executed in the above-described step 903, and the reception side selects a suitable transmission mode corresponding to the number of channels at that time period, is executed, and thus the control operation is terminated.

If the user's own apparatus is at the reception side in step 904, or a "vacant" channel is not generated in step 905, the control operation is terminated without executing the following steps. If the channel is in a "vacant" state even in the reception mode in the above-described step 906, the process proceeds to step 911, where the channel in a "vacant" state is released, and thus the control operation is terminated.

According to the multimedia communication apparatus of the third embodiment of the present invention, when the stoppage of transmission of video information has been instructed by an operation of the user, it is determined whether or not a channel in a "vacant" state has been generated in the transmission mode from the corresponding apparatus. If the result of the determination is affirmative, it is determined whether the channel in a "vacant" state is at the calling side or at the reception side, or at the side charged with a tariff or at the side not charged with a tariff. The corresponding channel is automatically released at the generation of the channel in a "vacant" state at the calling side or at the side charged with a tariff. It is thereby possible to prevent an unnecessary use of the network.

Fourth Embodiment

Figure 10:
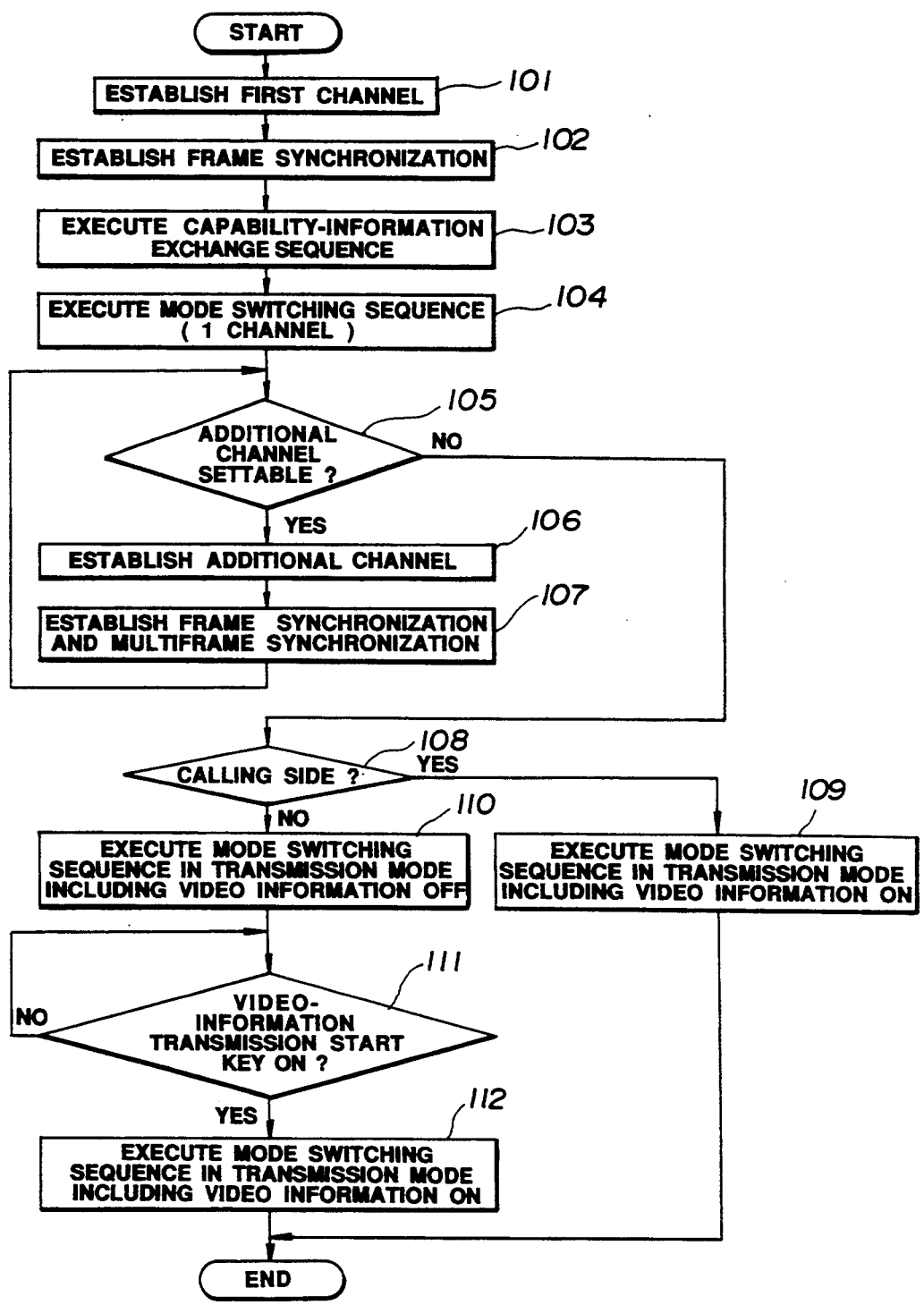
FIG. 10 is a flowchart showing a control-operation procedure in a fourth embodiment of the present invention.

Next, an explanation will be provided of a multimedia communication apparatus according to a fourth embodiment of the present invention with reference to the flowchart shown in FIG. 10.

Processing from step 101 to step 103 is the same as the processing from step 301 to step 303 shown in FIG. 3. In step 104, a mode switching sequence in which a mode of transmitting only voice information is selected is executed. Subsequently, in step 105, it is determined whether or not an additional channel is settable. If the result of the determination is affirmative, the process proceeds to step 106, where an additional channel is set and established. Subsequently, in step 107, frame synchronization and multiframe synchronization by the H. 221 frame are established.

The process then returns to step 105, where the same operation is repeated whenever necessary. When it has been determined in step 105 that setting of an additional channel has been completed or is impossible, the process proceeds to step 108, where it is determined whether the user's own apparatus is at the calling side or at the reception side. If the apparatus is at the reception side, a mode switching sequence in a transmission mode including transmission of video information on is executed in step 109, and the control operation is terminated. If it has been determined in step 108 that the apparatus is at the reception side, the process proceeds to step 110, where a mode switching sequence in a transmission mode including transmission of video information off executed.

At the reception side, in step 111, the process waits until the start of transmission of video information is instructed by an operation of an video-information transmission start key by the user. For example, it waits until the user turns on the video transmission key 21 shown in FIG. 2. When depression of the video transmission key 21 has been detected, the process proceeds to step 112, where a mode switching sequence in a transmission mode including transmission of video information on is executed, and thus the control operation is terminated.

As described above, according to the multimedia communication apparatus of the fourth embodiment of the present invention, by automatically turning on a trigger to start transmission of video information at the start of a calling operation at the calling side, and not automatically starting transmission of video information until an operation of the user at the reception side, it is possible to mitigate a negative reaction of the user against an instant response to the reception of a video telephone at the reception side.

Fifth Embodiment

Figure 11:
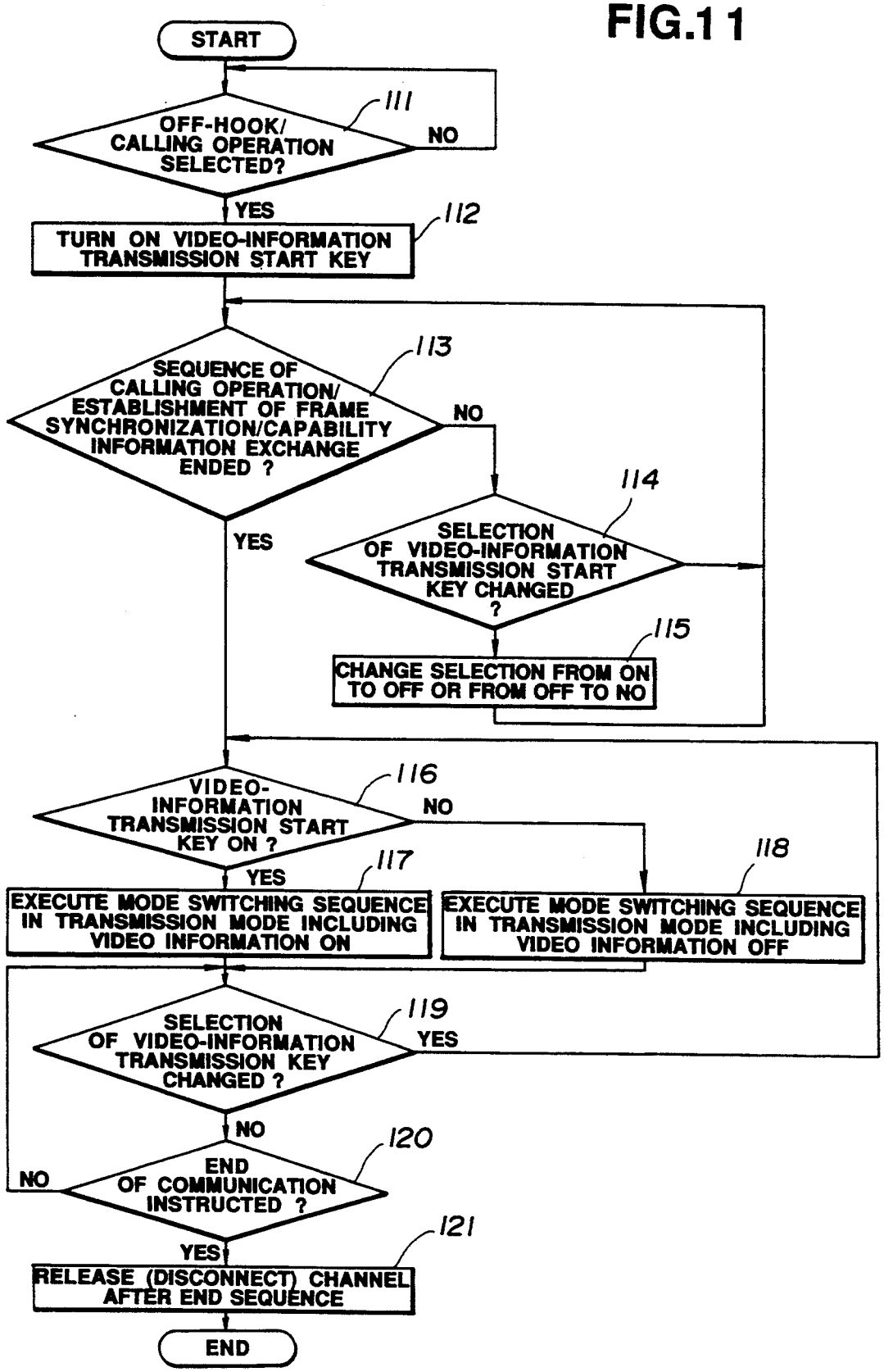
FIG. 11 is a flowchart showing a control-operation procedure in a fifth embodiment of the present invention.
Figure 12:
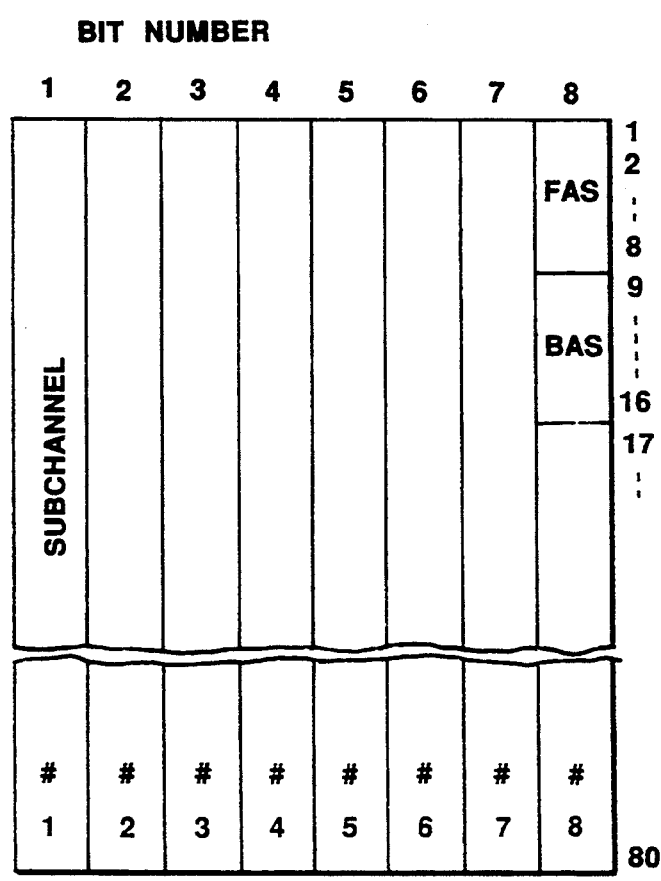
FIG. 12 is a diagram showing the configuration of a frame indicated in the CCITT's recommendation draft H. 221.

Next, an explanation will be provided of a multimedia communication apparatus according to a fifth embodiment of the present invention with reference to the flowchart shown in FIG. 11.

First, in step 111, it is determined whether or not selection of a calling operation, such as off-hook of the handset, or on-hook dialing, has been performed. If the result of the determination is affirmative, the process proceeds to step 112, where t, he video-information transmission start key is automatically turned on. For example, the video transmission key 21 shown in FIG. 2 is turned on. At that time, the user can immediately determine whether or not a on-state is provided according to a display on the display unit 20 shown in FIG. 2.

Subsequently, in step 113, it is determined whether or not a series of operations, such as a calling operation, establishment of a channel, establishment of frame synchronization, a capability-information exchange sequence, and the like, have been completed. If the result of the determination is negative, that is, until the communication partner's number is input via the ten keys 25 shown in FIG. 5, a calling operation on the D-channel is terminated, a channel is established, frame synchronization by the H. 221 frame on in-channel is established, and a mode switching sequence is started after the capability-information exchange sequence by a BAS has been completed, then whether or not the selection of the video-information transmission start key has been changed is checked in step 114. If the result of the determination in step 114 is affirmative, the selection is changed from on to off, or from off to on in step 115, and the process returns to step 113. In the case of FIG. 2, this change of the selection is performed from on to off or vice versa by a one-touch operation of depressing the video transmission key 21.

On the other hand, if the series of operations have been completed in the above-described step 113, the process proceeds to step 116, where it is determined whether the video-information transmission start key is turned on or off at that time period. If the key is turned on, the process proceeds to step 117, where a mode switching sequence in a transmission mode including transmission of video transmission on is executed. If the key is turned off, the process proceeds to step 118, where a mode switching sequence in a transmission mode including transmission of video information off is executed.

The process then proceeds to step 119. It waits while checking in step 119 whether or not the selection of the video-information transmission key has been changed, and checking in step 120 whether or not the end of communication has been instructed. When the selection of the video-information transmission key has been changed in step 119, the process returns to step 116, where the same processing as described above is executed. When the end of communication has been instructed in step 120, the process proceeds to step 121, where the end sequence is executed and the channel is then released (disconnected). Thus, the control operation is terminated.

As described above, according to the multimedia communication apparatus of the fifth embodiment of the present invention, by starting a calling operation, such as off-hook, on-hook dialing or the like, in a video-telephone communication mode, a video transmission mode is automatically entered by default, i.e., an on-state, which is displayed to the user by means of a LED display or the like, and the start of video information is turned off at the reception side by a one-touch operation of a video transmission key or the like. It is thereby possible to mitigate a negative reaction of the user at the calling side against a video-telephone calling operation, and to perform image communication which is more friendly to the user.

Although in the above-described respective embodiments, only processing in multiplexing voice information and video information has been explained, the same processing may also be performed in multiplexing various kinds of information including data information, such as HSD, LSD or the like defined in H. 221/H. 242. Furthermore, for the purpose of simplifying explanation, a case in which plural channels up to 2B are used has been explained, but the present invention may also be applied to a case in which a greater number of plural channels are used.

In the explanation with reference to FIG. 9, for the purpose of simplifying the explanation, after determining whether the user's own apparatus is at the calling side or at the reception side in step 904, whether or not a channel in a "vacant" state is present is determined in step 905. However, when plural channels are used, a case may be considered in which the calling side and the reception side differ for respective channels. In such a case, assuming that all the states for the respective channels are stored, it is determined whether the user's own apparatus is at the calling side or at the reception side on the corresponding channel after detecting that a channel in a "vacant" state is present. Instead of the determination whether the user's own apparatus is at the calling side or at the reception side, it is also possible to determine whether or not the apparatus is at the side charged with a tariff, in consideration of a service in which a tariff is charged to the reception side.

Instead of unconditionally setting default of transmission of video information at the calling side and at the reception side, it is possible, for example, to change the setting in accordance with the communication partner, or to turn on transmission of video information only when particular information is received utilizing user-user information on the D-channel, an expanded BAS on in-channel, or the like.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A multimedia communication apparatus for communicating with a destination apparatus, said communication apparatus and the destination apparatus each having a respective capability to transmit and receive data within predetermined limits, and each being operable in any one of a respective plurality of communication modes for transmitting and receiving data within the limits set by the respective capability, wherein in each communication mode, at least one channel for data communication is set, said communication apparatus comprising:

data communication means for communicating first and second data to the destination apparatus, the first data being a different kind of data from the second data;

determination means for determining which of the communication modes can be used to communicate data between said communication apparatus and the destination apparatus, to designate one communication mode that can be so used, and to set the communication apparatus to operate in the designated communication mode, the determination being made in accordance with the capability of the destination apparatus and the capability of said communication apparatus;

setting means connected to said determination means and responsive to the determination and the designation of the determination means for setting at least a first channel having a structure defining how data is communicated therein between said communication apparatus and the destination apparatus; and comparison means connected to said determination means and said setting means for deriving a transmission rate at which said first data can be communicated within the first channel in accordance with the structure of the first channel, and for comparing the derived transmission rate with a defined value indicative of a sufficient transmission rate of said first data within the first channel, wherein said setting means does not set a second channel between said communication apparatus and the destination apparatus, even if a second channel is settable within the designated communication mode, when the derived transmission rate is greater than the defined value.

2. An apparatus according to claim 1, wherein the first data comprises image data and the second data comprises voice data, and wherein said data communication means communicates the image data and the voice data while multiplexing these data.

3. An apparatus according to claim 1, wherein said setting means sets the second channel if the derived transmission rate is smaller than the defined value and if the second channel is settable.

4. A multimedia communication apparatus for communicating with a destination apparatus, said communication apparatus and the destination apparatus each having a respective capability to transmit and receive data within predetermined limits, and each being operable in any one of a respective plurality of communication modes for transmitting and receiving data within the limits set by the respective capability, wherein in each communication mode, at least one channel for data communication is set, said communication apparatus comprising:

data communication means for communicating first and second data to the destination apparatus, the first data being a different kind of data from the second data;

first setting means for setting a first channel having a structure defining how data is to be communicated therein between said communication apparatus and the destination apparatus, and for enabling communication of the second data within the first channel;

input means operable by a user for inputting an instruction to start transmission of the first data within the first channel; and means for deriving a transmission rate at which the first data can be communicated within the first channel in accordance with the structure of the first channel and the instruction input from said input means, wherein said data communication means communicates the first data in accordance with the derived transmission rate after the input of the instruction to start communication of the first data.

5. An apparatus according to claim 4, wherein the first data comprises video data and the second data comprises voice data, and wherein said data communication means communicates the video data and the voice data while multiplexing these data.

6. An apparatus according to claim 4, further comprising determination means for determining which of the communication modes can be used to communicate data between said communication apparatus and the destination apparatus, to designate one communication mode that can be so used, and to set the communication apparatus to operate in the designated communication mode, the determination being made in accordance with the capability of the destination apparatus and the capability of said communication apparatus, and wherein said deriving means derives the derived transmission rate in accordance with the determination of said determination means.

7. An apparatus according to claim 4, further comprising comparison means for comparing the derived transmission rate with a defined value indicative of a sufficient transmission rate of said first data within the first channel, and second setting means for setting a second channel between said communication apparatus and the destination apparatus if the derived transmission rate is smaller than the defined value, and if the second channel is settable.

8. A multimedia communication apparatus for communicating with a destination apparatus, said communication apparatus and the destination apparatus each having a respective capability to transmit and receive data within predetermined limits, and each being operable in any one of a respective plurality of communication modes for transmitting and receiving data within the limits set by the respective capability, wherein in each communication mode, at least one channel for data communication is set, said communication apparatus comprising:

data communication means for communicating first and second data to the destination apparatus, the first data being a different kind of data from the second data;

first determination means for determining whether or not turning-off of communication of the first data has been selected during communication of the first and second data by said data communication means in a selected one of the communication modes, said communication apparatus turning-off communication of the first data in response to the selection;

second determination means for determining whether or not a channel for communicating data in the selected communication mode has become vacant by the turning-off of the communication of the first data; and releasing means for, if said second determination means has determined that a channel has become vacant, releasing the vacant channel from use.

9. An apparatus according to claim 8, wherein the first data comprises video data and the second data comprises voice data, and wherein said data communication means communicates the video data and the voice data while multiplexing these data.

10. An apparatus according to claim 8, further comprising third determination means for selecting the selected communication mode by determining which of the communication modes can be used to communicate data between said communication apparatus and the destination apparatus, to designate one communication mode that can be so used, and to set the communication apparatus to operate in the designated communication mode, the determination being made in accordance with the capability of the destination apparatus and the capability of said communication apparatus.

11. A multimedia communication apparatus for communicating with a destination apparatus, said communication apparatus and the destination apparatus each being operable in any one of a plurality of communication modes for data communication, comprising:

- data communication means for communicating first and second data to the destination apparatus, the first data being a different kind of data from the second data;
- determination means for determining whether said communication apparatus is at a calling side for transmitting data or at a reception side for receiving data;
- first setting means for setting said communication apparatus to operate in a first one of the plurality of communication modes which allows transmission of the first and second data by said data communication means if said communication apparatus is at the calling side;
- second setting means for setting said communication apparatus to operate in a second one of the plurality of communication modes which allows transmission of the first data by said data communication means if said communication apparatus is at the reception side; and
- third setting means for setting said communication apparatus to operate in a third one of the plurality of communication modes which allows transmission of the first and second data if transmission of the first data is selected according to an instruction input by an operator after the second mode has been set by said second setting means.

12. An apparatus according to claim 11, wherein the first data comprises video data and the second data comprises voice data, and wherein said data communication means communicates the video data and the voice data while multiplexing these data.

13. A multimedia communication apparatus for communicating with a destination apparatus, said communication apparatus and the destination apparatus each having a respective capability to transmit and receive data within predetermined limits, and each being operable in any one of a respective plurality of communication modes for transmitting and receiving data within the limits set by the respective capability, comprising:

- data communication means for communicating first and second data to the destination apparatus, the first data being a different kind of data from the second data;
- selection means for selecting turning-on or turning-off of transmission of the first data to the destination apparatus, said selecting means having an on-state in which it can make a selection and an off-state it which it cannot make a selection;
- detection means connected to said selection means for detecting a start of transmission;
- setting means for setting said selection means to the on-state when said detection means has detected the start of the transmission;
- determination means for determining which of the communication modes can be used to communicate data between said communication apparatus and the destination apparatus, to designate one communication mode that can be so used, and to set the communication apparatus to operate in the designated communication mode, the determination being made in accordance with the capability of the destination apparatus and the capability of said communication apparatus; and
- control means for keeping said selection means in the on-state up until a time when said determination means designates a communication mode.

14. An apparatus according to claim 13, wherein the first data comprises video data and the second data comprises voice data, and wherein said data communication means communicates the video data and the voice data while multiplexing these data.

* * * * *

UNITED STATES PATENT AND TRADEMARK OFFICE
CERTIFICATE OF CORRECTION

PATENT NO. : 5,381,412
DATED : January 10, 1995
INVENTOR(S) : MASATOSHI OTANI

It is certified that error appears in the above-identified patent and that said Letters Patent is hereby corrected as shown below:

COLUMN 4

Line 52, "stitching" should read --switching--.
    Line 67, "rithm," should read --algorithm,--.

COLUMN 5

Line 17, "inn" should read --input--.
    Line 56, "unit L0" should read --unit 10--.

COLUMN 7

Line 15, "step 308," should read --step 306,--.

COLUMN 9

Line 35, "decreased" should read --released--.

Signed and Sealed this

Twentieth Day of June, 1995

Attest:

BRUCE LEHMAN

*Attesting Officer*      *Commissioner of Patents and Trademarks*